Dec. 7, 1971   D. V. BOSLEY ET AL   3,624,900
SAFETY SCISSORS
Filed Nov. 26, 1969   3 Sheets-Sheet 1
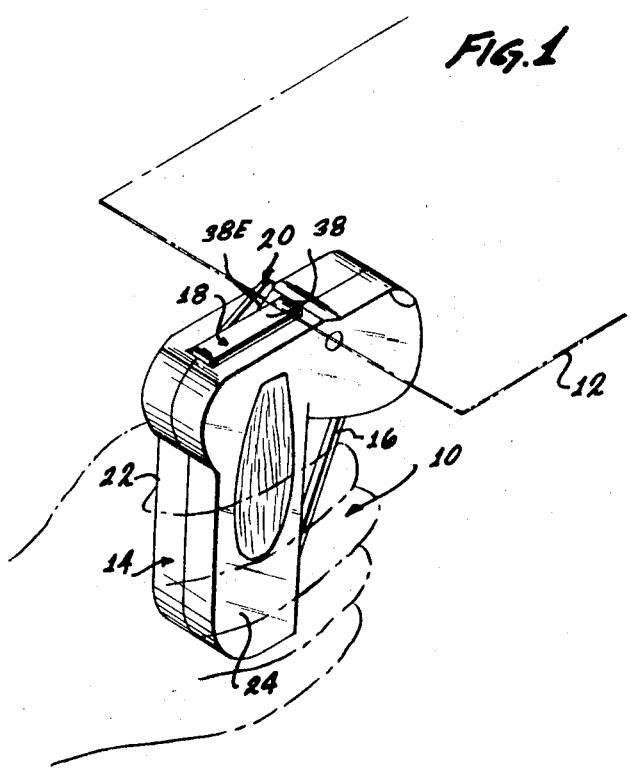
FIG.1
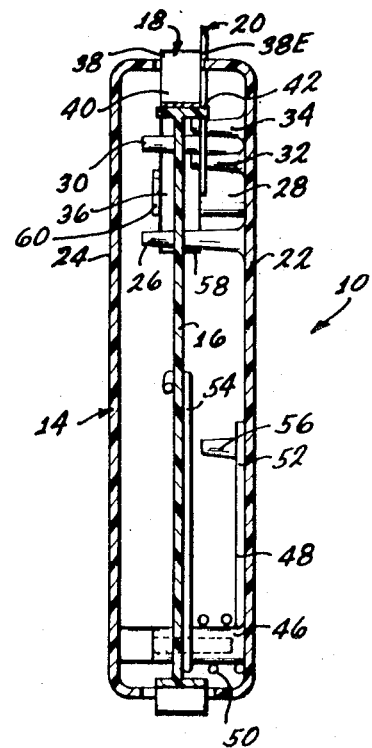
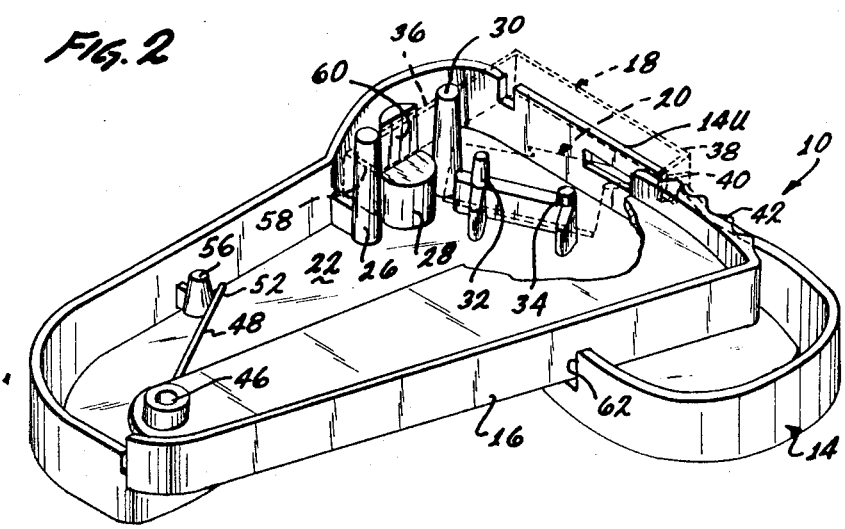
FIG.2   FIG.4
INVENTORS
DENIS V. BOSLEY
HENRY J. FOLSON
JOHN W. RYAN
BY Max E. Shirk
ATTORNEY

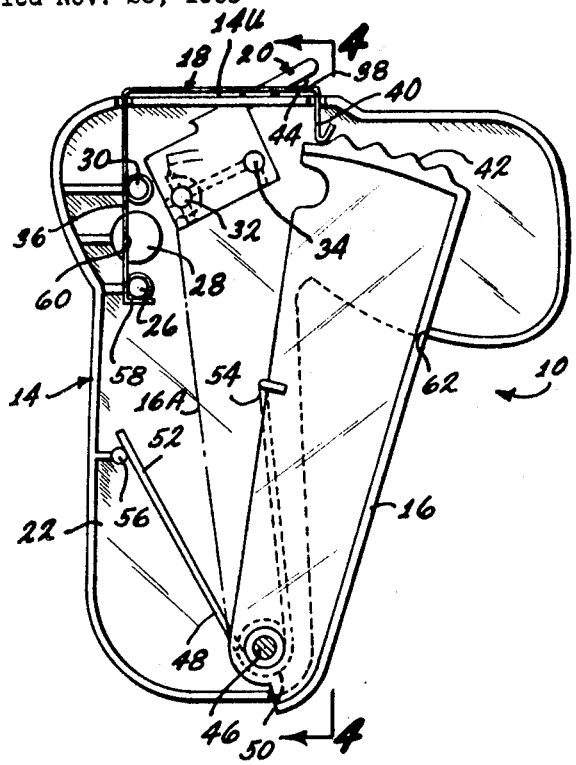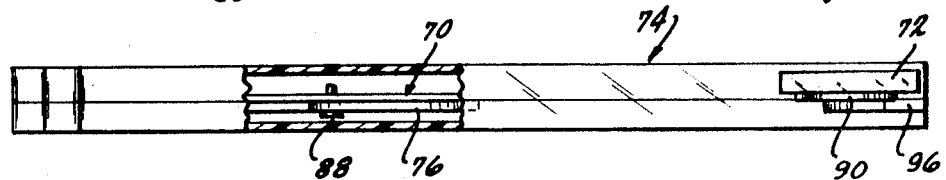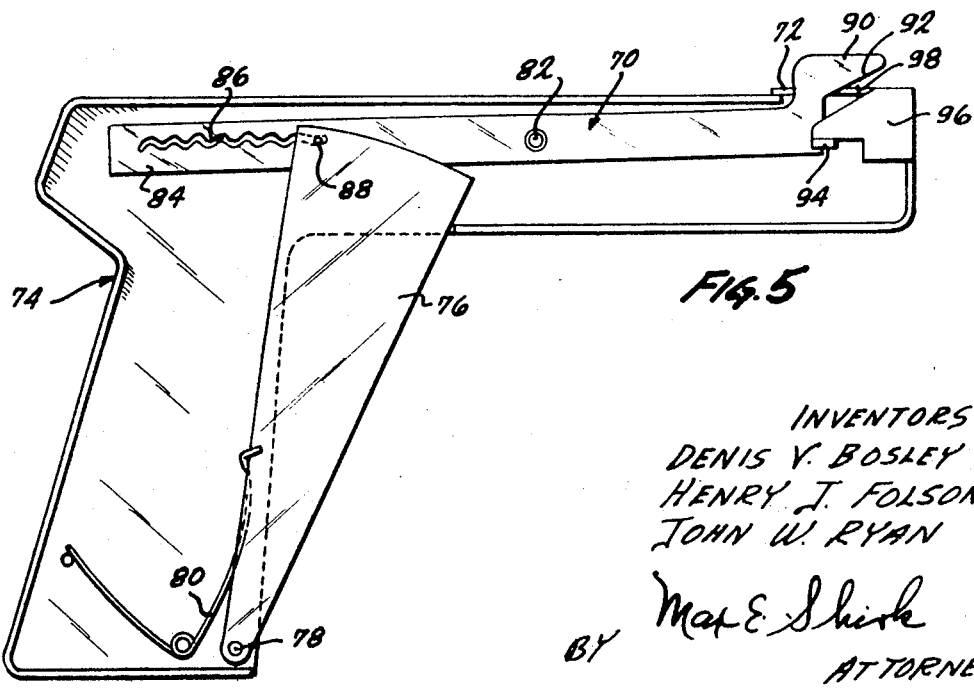

Dec. 7, 1971   D. V. BOSLEY ET AL   3,624,900
SAFETY SCISSORS

Filed Nov. 26, 1969   3 Sheets-Sheet 3

INVENTORS
DENIS V. BOSLEY
HENRY J. FOLSON
JOHN W. RYAN

BY Max E. Shirk
ATTORNEY

United States Patent Office

3,624,900
Patented Dec. 7, 1971

3,624,900
SAFETY SCISSORS
Denis V. Bosley, Palos Verdes Peninsula, Henry J. Folson, Redondo Beach, and John W. Ryan, Los Angeles, Calif., assignors to Mattel, Inc., Hawthorne, Calif.
Filed Nov. 26, 1969, Ser. No. 880,006
Int. Cl. B26b 13/08
U.S. Cl. 30—234                                4 Claims

ABSTRACT OF THE DISCLOSURE

A scissors-type device for cutting a paper comprising a first rigid shearing member fixed to a housing and a second shearing member mounted to oscillate relative to the first member. A trigger mounted on the housing has a wavy upper portion that engages the second shearing member to move it rapidly up and down a small distance when the trigger is pulled.

BACKGROUND OF THE INVENTION (1) Field of the invention

This invention relates to scissors and other shearing devices adapted to be held in the hand.

(2) Description of the prior art

The entertainment value of toys is often enhanced by the use of mechanisms which operate in a novel manner. Children often find great entertainment in playing with scissors and paper. A paper shearing device which operated in a novel manner could provide entertainment in addition to that derived from cutting the paper. Such a mechanism would preferably be highly safe to prevent children from cutting their fingers or even their fingernails, or household objects such as tablecloths.

OBJECTS AND SUMMARY OF THE INVENTION

An object of the present invention is to provide a shearing device which operates in a novel and entertaining manner.

Another object is to provide a hand-held shearing device which enables more accurate cutting of irregular outlines.

Yet another object is to provide a shearing device which is safe for use by small children.

In accordance with the present invention, a shearing device is provided which enables children to cut paper in an entertaining, safe, and accurate manner. The apparatus includes a housing and a pair of shearing members, one member fixed to the housing and the other mounted to move a small distance with respect to the fixed member. Apparatus is provided for oscillating the movable shearing member rapidly with respect to the fixed member to enable many small cuts to be made in rapid succession.

In one embodiment of the invention, the movable shearing member comprises a spring with an inner end fixed to the housing and a free outer end portion passing across the fixed shearing member and extending down into the housing. A hand-operated trigger is pivotally mounted on the housing, the trigger having a wavy edge portion which is engaged with the extreme outer end of the spring shearing member. When the trigger is pulled, the wavy edge portion passes along the outer end of the spring shearing member to move it rapidly up and down. This causes the spring shearing member to make several cuts into the paper, so that each pull of the trigger cuts a substantial length of paper. In another embodiment of the invention, the movable shearing member is pivotally mounted on the housing, and it carries a wavy slot whose walls are engaged by a pin on the trigger, so that pulling the trigger causes the movable shearing member to rapidly pivot up and down by a small distance.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a shearing device constructed in accordance with the invention, showing its manner of use in cutting a sheet of paper;

FIG. 2 is a perspective view of the shearing device of FIG. 1 with one portion of the housing removed;

FIG. 3 is a plan view of the shearing device of FIG. 2;

FIG. 4 is a sectional view taken on the lines 4—4 of FIG. 3;

FIG. 5 is a sectional side view of a shearing device constructed in accordance with another embodiment of the invention;

FIG. 6 is a plan view of the apparatus of FIG. 5;

DESCRIPTION OF THE PREFERRED EMBODIMENTS

Figure 7:
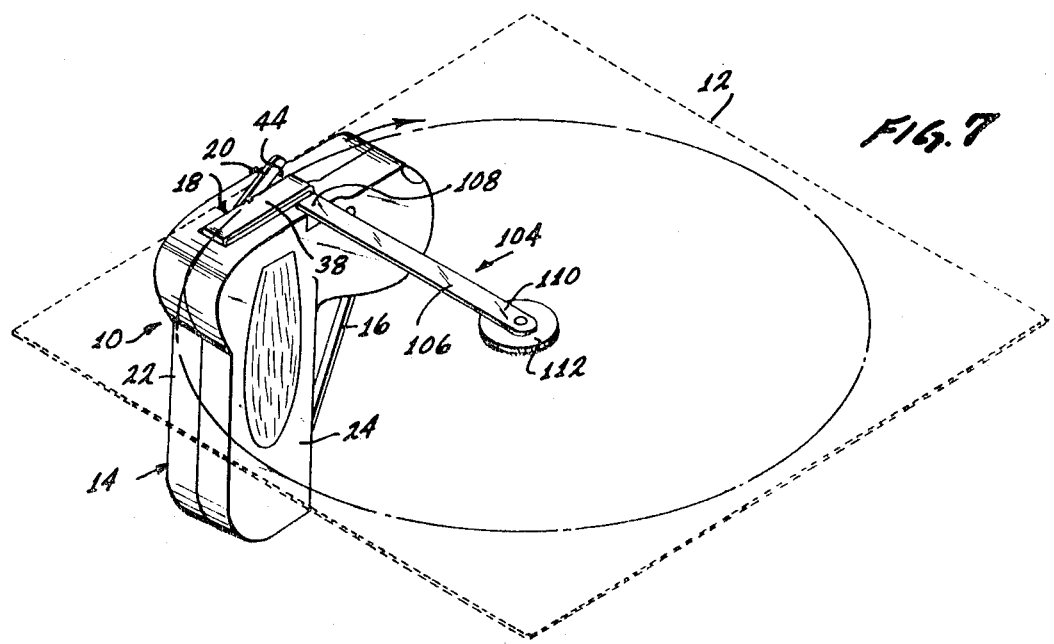
FIG. 7 is a perspective view of a circle cutting attachment, shown in use with the shearing device of FIG. 1.

FIG. 1 illustrates a shearing device 10 suitable for use by a small child who holds it in his hand to cut a sheet of paper 12. The shearing device includes a housing 14 which can be held by a child, and a trigger-like member 16 which can be pulled to operate the mechanism. A pair of shearing members 18, 20 at the top of the housing can receive the sheet of paper between them. The shearing member 20 is stationary, but the other member 18 can move up and down a short distance to cut the paper 12 by shearing action between the two shearing members. Each time the trigger 16 is pulled, the member 18 is moved up and down many times so that many small cuts are made in the sheet. The housing is shown in a shape representing that of a head of a dog to enhance its appearance to children. The housing has a substantially straight and even upper housing portion 14U where shearing is performed.

As shown in FIGS. 2-4, the housing includes two housing sections 22, 24. Section 22 includes three spring-holding members 26, 28, 30, that hold the shearing member 18. A pair of holding members 32, 34 hold the other shearing member 20 so it projects upwardly and forwardly from the upper housing portion 14U. The shearing member 18 is constructed of a strip of spring steel formed with an inner end portion 36 that is adapted to be held on the housing and an outer end portion 38. The outer portion 38 extends parallel to the even upper housing portion 14U, across the other shearing member 20, and down into the housing. An extreme outer end portion 40 which lies within the housing, is in the path of a wavy edge portion 42 on the trigger member 16. When the trigger 16 is pulled, the four undulations on portion 42 pass across the extreme outer end portion 40 to move the spring shearing member 18 up and down four times. A sheet of paper that has been pushed or pulled into the nip region 44 of the shearing members is therefore subjected to four small cuts at each pulling of the trigger. The trigger 16 is pivotally mounted on a pin 46, and is biased toward a forward position by a spring 48. The spring has a center portion 50 which extends several turns around the pin 46, and outer end portions 52, 54 which are biased against a retaining pin 56 on the housing and a rear edge of the trigger, respectively.

The inner end portion 36 of the spring shearing member has an extreme inner end 58 which extends about the holding member 26 to limit the upward position of the shearing member. The rotational position of the spring shearing member is fixed by the three holding members 26, 28, 30, so that it tends to return to the illustrated position whenever it is flexed. In order to urge the shearing members 18 and 20 into contact with each other, the holding members 26, 30, are formed as tapered pins, while the other member 28 has an inclined abutting surface 60. The slightly inclined surfaces of these three holding members tends to twist the spring shearing member 18 so that its edge 38E at the outer end portion 38 is urged against the other shearing member 20. However, the outer end portion 38 can move away from member 20 if a material is encountered which is difficult to shear, such as cardboard or a typical tablecloth material. A thin and easily sheared material such as paper will be cleanly cut.

The extreme outer end portion 40 of the spring shearing member is bent up to provide a rounded portion for contacting the undulating trigger portion 42. This allows the end portion 40 to ride up and down along the undulations with a minimum of friction, yet enables the construction of the spring shearing member in a very economical manner. The wavy portion 42 of the trigger member can carry a greater or lesser number of waves of various forms, to vary the number and size of cuts. The apparatus is constructed so that the trigger member can move between positions 16 and 16A, the movement being limited by a ledge 62 on the housing and the pin 32 which holds the stationary shearing member.

The shearing device is not only entertaining to use, but can be easily manipulated by small children to cut paper, the numerous small cuts often facilitating cutting a long irregular outline. The freedom of spring shearing member 18 to deflect sidewardly away from shearing member 20 prevents the cutting of thick materials such as cardboard, tablecloths, or fingernails. Of course, provisions could be made, if desired, to prevent excessive sideward springing of member 18 away from the other shearing member 20 to allow for the cutting of thicker materials in the case of shearing apparatus which may be constructed for adult use.

FIGS. 5 and 6 illustrate another embodiment of the invention which employs a pivotally mounted shearing member 70 that operates in conjunction with a fixed shearing member 72 to take many small cuts in a sheet of paper. In this design, the stationary shearing member 72 extends along the housing surface, while the movable member juts out in a forward and upward direction. The apparatus includes a housing 74 with a trigger member 76 pivotally mounted at 78 thereon, which can be pulled against the force of a spring 80 to operate the mechanism. The movable shearing member 70 is pivotally mounted at 82 on the housing and has an inner end 84 with a slot 86 therein including undulating or wavy slot walls or edges. The trigger member has a pin 88 that is engaged with the slot, so that as the trigger is pulled, it rides along the slot and causes the inner end of the shearing member 70 to rapidly oscillate up and down. The outer end portion 90 of the pivotable shearing member extends past the housing and has an edge 92 that lies against an edge of the other shearing member 72. A spring member 94 biases the outer end of the pivotable shearing member 90 against the other shearing member 72 to facilitate the cutting of paper, while allowing the shearing members to separate when a thick or hard-to-cut material is encountered. A bracket 96 at the side of the pivotable shearing member 70 prevents excessive separation of the shearing members.

The apparatus of FIGS. 5 and 6 enables the safe cutting of paper by children in an entertaining and accurate manner. The housing 74 is in the shape of a gun to enhance its appearance. The gun shape locates the nip 98 of the shearing members, where cutting occurs, to be spaced several inches in front of the trigger 76. This has an advantage of encouraging children to grasp a sheet of paper behind the nip 98 and pull it into the nip. Otherwise there is a tendency for children to grasp the sheet in front of the nip and attempt to push it towards the cutting device, often resulting in the paper buckling which hampers smooth cutting.

Figure 8:
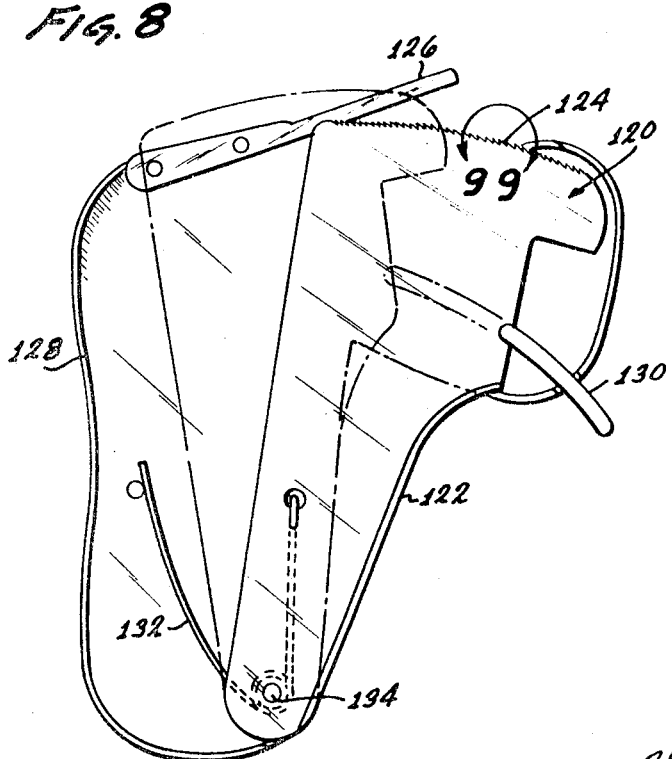
FIG. 8 is a sectional side view of a shearing device constructed in accordance with still another embodiment of the invention.
Figure 9:
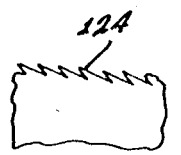
FIG. 9 is a view of area 9—9 of FIG. 8.

FIGS. 8 and 9 illustrate another embodiment of the invention wherein one shearing member 120 makes one large stroke each time a trigger portion 122 thereon is pulled to operate in a manner somewhat similar to the operation of an ordinary scissors. However, the shearing edge 124 of that member is serrated to make many small cuts as it crosses the shearing edge of a fixed shearing member 126. The serrations on edge 124 are tilted in a rearward direction, instead of pointing perpendicular to the edge portion from which they extend. The rearward tilting results in the serrations gripping the paper and pulling it into the nip where shearing occurs. Both shearing members are constructed from thin sheets of metal, and they deflect when an attempt is made to cut thick material.

The housing 128 of the shearing device is in the form of a dog. A tongue member 130 is mounted on the shearing member 120 to project from the housing when the shearing member is in a forward position, and to retract when the trigger is pulled, like a dog's tongue. A spring 132 biases the shearing member 120 towards its forward position, and a pivot 134 pivotally couples the shearing member to the housing. Only one side of the housing 20 is shown, the other side being almost a reverse image.

FIG. 7 illustrates an attachment 104 which facilitates the cutting of circles in a sheet of paper 12. The apparatus includes an arm 106 with an inner end 108 fixed to the shearing device 10 of FIG. 1. The outer end 110 of the arm is pivotally mounted on a paper engaging member 112 which has a tacky bottom side that sticks to the paper, but can be released therefrom. The arm 106 extends at right angles to the direction of cutting of the shearing members 18, 20, and from a position which approximately intersects the nip 44 of the shearing members. When the circle cutting attachment 104 is mounted on the shearing device, it enables a child to accurately cut a large circle in a sheet of paper.

Thus the invention provides a safe, accurate, and highly entertaining shearing device. As mentioned above, the invention is especially useful as a paper cutter for children which cannot cut thick material, but can be constructed to allow the cutting of thick material if desired. While manual operating means, such as the triggers, have been illustrated, the oscillations of one of the shearing members can be performed by a motor.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Shearing apparatus comprising:
   a housing;
   a first shearing member fixedly mounted on said housing;
   a second shearing member mounted on said housing for movement relative to said first member to cut material between it and said first shearing member;
   a pair of driving means, one defining a wavy edge portion and the other defining a follower for engaging said wavy edge portion, a first of said driving means coupled to said second shearing member; and
   means for moving the other of said driving means relative to said first driving means; said second shearing member comprising a spring member having an inner end portion fixed in position on said housing and an outer portion that extends across said first shearing member;

said first driving means comprising part of said outer portion of said spring member.

2. The shearing apparatus described in claim 1 wherein:

said spring member is substantially a strip with its edge against said first shearing member; and said housing includes spring holding means for holding said inner end of said spring member in a position to urge said edge of said outer end against said first shearing member.

3. The shearing apparatus described in claim 1 wherein:

said second driving means forms said wavy edge; and said second shearing member comprises an elongated spring member with an inner end portion fixed in position on said housing, a first outer end portion extending by said first shearing member, and a second outer end portion forming said first driving member, said inner end portion positioned so that said second outer end portion is biased against said wavy edge of said second driving means.

4. Shearing apparatus comprising:

a housing;

a first shearing member fixed to said housing;

a second shearing member of resilient material extending across said first member, said second member having an inner end portion mounted on said housing and a free outer end portion with drive means thereon;

manual operating means including a member with drive means for moving along said drive means on said second shearing member, one of said drive means defining a wavy surface to oscillate said outer end portion of said second shearing member [.]; said second shearing member being in the form of a strip with an edge that extends across the edge of said first shearing member, and with a rounded outer end portion; and said manual operating means comprising a trigger member pivotally mounted on said housing, and having a surface defining said wavy surface.

References Cited

UNITED STATES PATENTS

| 1,162,796 | 12/1915 | Mattson | 30—250 |
| 1,572,791 | 2/1926 | Guymon | 30—234 |
| 3,492,724 | 2/1970 | Goss | 30—258 |

FOREIGN PATENTS

| 448,695 | 6/1936 | Great Britain | 56—240 |

THERON E. CONDON, Primary Examiner

J. C. PETERS, Assistant Examiner

U.S. Cl. X.R.

30—249